United States Patent
Zhu et al.

(10) Patent No.: US 12,319,826 B2
(45) Date of Patent: Jun. 3, 2025

(54) PIEZORESISTIVE COMPOSITES VIA ADDITIVE MANUFACTURING AND COMPOSITE FILAMENTS ASSOCIATED THEREWITH

(71) Applicant: Xerox Corporation, Norwalk, CT (US)

(72) Inventors: Yujie Zhu, Mississauga (CA); Sarah J. Vella, Milton (CA); Alexandros Vasileiou, Toronto (CA)

(73) Assignee: Xerox Corporation, Norwalk, CT (US)

( * ) Notice: Subject to any disclaimer, the term of this patent is extended or adjusted under 35 U.S.C. 154(b) by 365 days.

(21) Appl. No.: 17/701,364

(22) Filed: Mar. 22, 2022

(65) Prior Publication Data

US 2023/0323146 A1  Oct. 12, 2023

(51) Int. Cl.
*C09D 11/52* (2014.01)
*B29C 64/118* (2017.01)
(Continued)

(52) U.S. Cl.
CPC ............ *C09D 11/52* (2013.01); *B29C 64/118* (2017.08); *B29C 64/314* (2017.08); *B33Y 10/00* (2014.12);
(Continued)

(58) Field of Classification Search
CPC .......... B29C 64/118; B29C 48/05; D01F 1/09
See application file for complete search history.

(56) References Cited

U.S. PATENT DOCUMENTS 10,744,695 B2   8/2020  Erikson et al.
2022/0025553 A1  1/2022  Onogi et al.

FOREIGN PATENT DOCUMENTS

CN   101249410 A  * 8/2008  .............. B01J 13/04
EP   4184529 A1    5/2023
WO   2012160288 A1  11/2012

OTHER PUBLICATIONS

Tang, Zhenhua, et al. "3D Printing of Highly Sensitive and Large-Measurement-Range Flexible Pressure Sensors with a Positive Piezoresistive Effect", ACS Applied Materials & Interfaces, 2020, pp. 28669-28680, 12.

(Continued)

*Primary Examiner* — Khanh T Nguyen
(74) *Attorney, Agent, or Firm* — Vorys, Sater, Seymour and Pease LLP

(57) ABSTRACT

Parts made by additive manufacturing are often structural in nature, rather than having functional properties conveyed by a component present therein. Composite filaments suitable for additive manufacturing may comprise a continuous polymer phase of a first thermoplastic polymer and a second thermoplastic polymer that are immiscible with one another, and electrically conductive particles distributed in the continuous polymer phase, such as microparticles, nanoparticles, or any combination thereof. The first thermoplastic polymer is dissolvable or degradable and the second thermoplastic polymer is insoluble or non-degradable under specified conditions. Removal of the first thermoplastic polymer from a printed part may introduce porosity thereto, thereby inducing or enhancing piezoresistivity within the printed part. An aqueous mixture comprising the electrically conductive particles and the first and second thermoplastic polymers may have water removed therefrom, and the resulting composite residue may be extruded to form the composite filaments.

19 Claims, 14 Drawing Sheets

(51) Int. Cl.
     *B29C 64/314*    (2017.01)
     *B33Y 10/00*     (2015.01)
     *B33Y 40/10*     (2020.01)
     *B33Y 70/00*     (2020.01)
     *C09D 11/023*    (2014.01)
     *C09D 11/037*    (2014.01)
     *C09D 11/102*    (2014.01)
     *B29K 75/00*     (2006.01)
     *B29K 505/14*    (2006.01)

(52) U.S. Cl.
     CPC ............ *B33Y 40/10* (2020.01); *B33Y 70/00* (2014.12); *C09D 11/023* (2013.01); *C09D 11/037* (2013.01); *C09D 11/102* (2013.01); *B29K 2075/00* (2013.01); *B29K 2505/14* (2013.01); *B29K 2995/0005* (2013.01); *B29K 2995/0062* (2013.01)

(56) References Cited

OTHER PUBLICATIONS

Yao, HB, et al. "A flexible and highly pressure-sensitive graphene-polyurethane sponge based on fractured microstructure design", Adv Mater, 2013, pp. 6692-6698, 25.

Yang, Lei, et al. "One-pot preparation of porous piezoresistive sensor with high strain sensitivity via emulsion-templated polymerization", Composites Part A: Applied Science and Manufacturing, 2017, pp. 195-198, 101.

Extended European Search Report from corresponding EP Application No. 23159602 mailed Sep. 19, 2023.

* cited by examiner

PIEZORESISTIVE COMPOSITES VIA ADDITIVE MANUFACTURING AND COMPOSITE FILAMENTS ASSOCIATED THEREWITH

FIELD

The present disclosure generally relates to additive manufacturing and, more particularly, additive manufacturing processes utilizing composites and continuous filaments thereof capable of forming printed parts exhibiting piezoresistive behavior.

BACKGROUND

Additive manufacturing, also known as three-dimensional printing (3-D printing), is a rapidly growing technology area. Although additive manufacturing has traditionally been used for rapid prototyping activities, this technique is being increasingly employed for producing commercial and industrial parts in any number of complex shapes. Additive manufacturing processes typically operate by building an object layer-by-layer, for example, by 1) deposition of a stream of molten printing material obtained from a continuous filament or 2) sintering powder particulates of a printing material using a laser. The layer-by-layer deposition usually takes place under control of a computer to deposit the printing material in precise locations based upon a digital three-dimensional "blueprint" of the part to be manufactured, with consolidation of the printing material taking place in conjunction with deposition to form the printed part. The printing material forming the body of a printed part may be referred to as a "build material" herein.

Additive manufacturing processes employing a stream of molten printing material for part formation typically utilize a thermoplastic polymer filament as a source of the molten printing material. Such additive manufacturing processes are sometimes referred to as "fused deposition modeling (FDM®)" or "fused filament fabrication (FFF)" processes. The latter term is used herein. Additive manufacturing processes employing thermoplastic pellets as a source of printing material are also known.

Additive manufacturing processes employing powder particulates of a printing material oftentimes perform directed heating in selected locations of a particulate bed following printing material deposition to promote coalescence of the powder particulates into a consolidated part. Techniques suitable for promoting consolidation of powder particulates to form a consolidated part include, for example, Powder Bed Fusion (PBF), selective laser sintering (SLS), Electron Beam Melting (EBM), Binder Jetting and Multi-Jet Fusion (MJF).

A wide range of printed parts having various shapes may be fabricated using both types of additive manufacturing processes. In many instances, build materials employed in both types of additive manufacturing processes may be largely structural in nature, rather than the build material having an innate functionality itself. It also may be difficult to introduce functional characteristics to a printed part after deposition thereof. Functional characteristics potentially of interest in printed parts include, but are not limited to, electrical conductivity, piezoelectric behavior, piezoresistive behavior, phase change behavior, color-change behavior, and the like.

Piezoresistive materials undergo a change in resistance with applied mechanical strain. For example, pressure sensors based on piezoresistive materials are used for many applications including automotive, medical, industrial, consumer, and building devices. At present, there are limited options for producing printed parts having a sufficient degree of piezoresistive behavior, given the scarcity of printing materials capable of exhibiting significant electrical conductivity following printing. Although there are some printing materials (polymers) that are modestly electrically conductive, they have not yet been demonstrated to produce printed parts having piezoresistive behavior. Filaments containing carbon-based additives are one example of currently available printing materials that may exhibit electrical conductivity, although the electrical conductivity is usually low (<1 S/cm) and the piezoresistive behavior potentially obtainable therefrom may be correspondingly limited. Porous networks, such as foams, may increase piezoresistive behavior, but such porosity is difficult to incorporate reliably into printed parts using currently available printing materials.

SUMMARY

The present disclosure provides composite filaments comprising: a continuous polymer phase comprising a first thermoplastic polymer and a second thermoplastic polymer that are immiscible with one another; wherein the first thermoplastic polymer is dissolvable or degradable under specified conditions, and the second thermoplastic polymer is insoluble or non-degradable under the specified conditions; and a plurality of electrically conductive particles distributed in the continuous polymer phase, the plurality of electrically conductive particles comprising microparticles, nanoparticles, or any combination thereof.

The present disclosure also provides composites or composite pellets comprising: a continuous polymer phase comprising a first thermoplastic polymer and a second thermoplastic polymer that are immiscible with one another; wherein the first thermoplastic polymer is dissolvable or degradable under specified conditions, and the second thermoplastic polymer is insoluble or non-degradable under the specified conditions; and a plurality of electrically conductive particles distributed in the continuous polymer phase, the plurality of electrically conductive particles comprising microparticles, nanoparticles, or any combination thereof.

The present disclosure also provides printed parts comprising: a continuous printed polymer matrix comprising a first thermoplastic polymer and a second thermoplastic polymer that are immiscible with one another; wherein the first thermoplastic polymer is dissolvable or degradable under specified conditions, and the second thermoplastic polymer is insoluble or non-degradable under the specified conditions; and a plurality of electrically conductive particles distributed in the continuous printed polymer matrix, the plurality of electrically conductive particles comprising microparticles, nanoparticles, or any combination thereof.

The present disclosure also provides piezoresistive printed parts comprising: a printed polymer matrix having porosity defined therein and comprising a plurality of electrically conductive particles distributed in a thermoplastic polymer.

The present disclosure still further provides methods for forming a composite filament containing electrically conductive particles. The methods comprise: combining a plurality of electrically conductive particles and a first thermoplastic polymer that is water-soluble with an aqueous dispersion of a second thermoplastic polymer that is water-insoluble to provide a combined aqueous mixture; removing water from the combined aqueous mixture to provide a composite residue comprising at least a portion of the electrically conductive particles distributed in a continuous polymer phase comprising the first thermoplastic polymer and the second thermoplastic polymer, the first thermoplastic polymer and the second thermoplastic polymer being immiscible with one another in the continuous polymer phase; and extruding the composite residue into a composite filament comprising the electrically conductive particles distributed in the continuous polymer phase.

The present disclosure also provides printing methods comprising: providing a composite filament of the present disclosure; and depositing the composite filament layer-by-layer above a softening temperature thereof to form a printed part.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
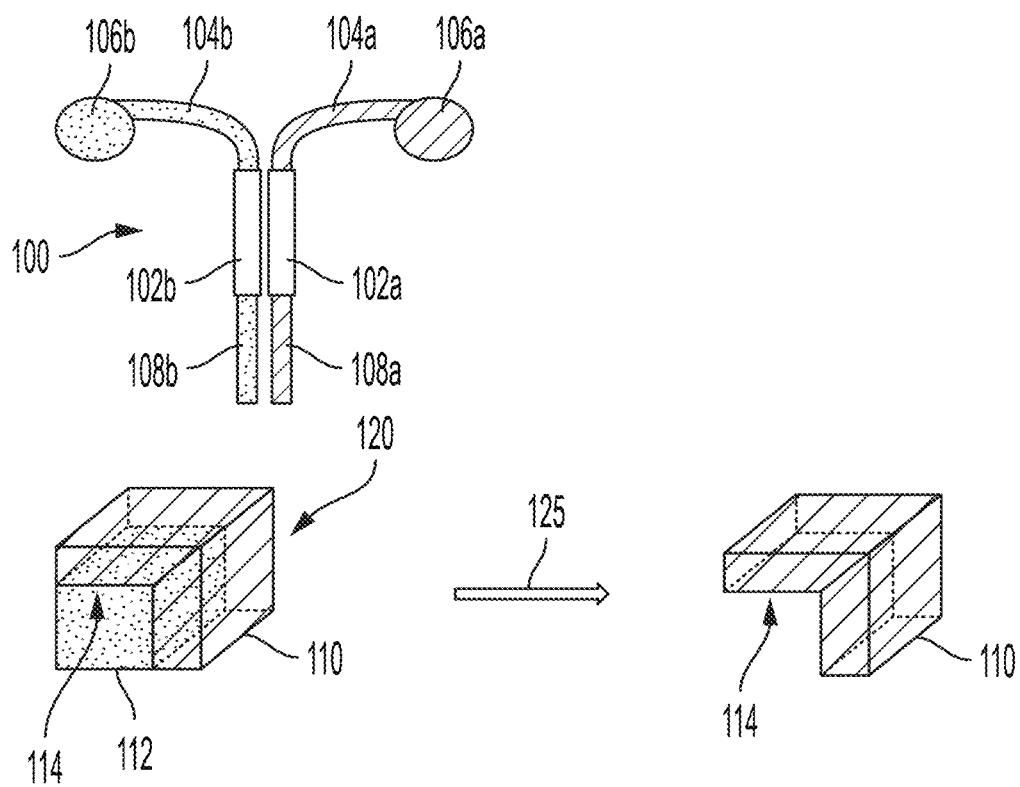
FIG. 1 shows a schematic of an illustrative fused filament fabrication process for producing a part using a build material and a removable support material.

The present disclosure generally relates to additive manufacturing and, more particularly, additive manufacturing processes utilizing composites and continuous filaments thereof capable of forming printed parts exhibiting piezoresistive behavior. More specifically, the present disclosure provides composite filaments suitable for fused filament fabrication additive manufacturing processes, which are capable of forming printed parts having piezoresistive properties after further processing. Pelletized forms of the composites may also be formed through utilization of the blending processes disclosed herein.

As discussed above, additive manufacturing processes, such as fused filament fabrication, are powerful tools for generating printed parts in a wide range of complex shapes. In many instances, the polymers used for performing fused filament fabrication are largely structural in nature and do not convey functional properties to a printed part by themselves. There are limited examples of polymer filaments compatible with fused filament fabrication exhibiting even modest electrical conductivity, and the piezoresistive behavior obtainable therefrom may be weak and of insufficient magnitude for various intended applications.

In response to the foregoing shortcomings, the present disclosure provides polymer composites and composite filaments obtained therefrom that are suitable for additive manufacturing (e.g., fused filament fabrication) and are capable of forming printed parts having significant piezoresistivity after processing to introduce porosity, as discussed further herein. Composite filaments that are suitable for fused filament fabrication may have diameters that are appropriate for the drive unit for a particular printing system, such as about 1.0 mm to about 10.0 mm (common filament diameters include 1.75 mm and 2.85 mm). The composite filaments may be of spoolable length, such as at least about 1 foot, or at least about 5 feet, or at least about 10 feet, or at least about 25 feet, or at least about 50 feet, or at least about 100 feet, or at least about 250 feet, or at least about 500 feet, or at least about 1000 feet. Other properties that may determine if a composite filament is suitable for fused filament fabrication include the temperature required to extrude the filament, which should not be undesirably high. A suitable filament for fused filament fabrication may minimize printing issues, such as oozing from the print nozzle or clogging of the print nozzle. Suitable composite filaments may additionally form printed parts that easily separate from a print bed or, alternately, exhibit strong adherence to a permanent substrate, have sufficient mechanical strength once printed, and exhibit good interlayer adhesion once printed, for example.

Composites of the present disclosure may comprise electrically conductive particles distributed in a continuous polymer phase comprising first and second thermoplastic polymers that are immiscible with one another, wherein one of the thermoplastic polymers is dissolvable or degradable and may be removed from the other thermoplastic polymer under specified conditions, thereby introducing porosity to the composite, or a filament or printed part formed therefrom, in a controlled manner. The term "continuous polymer phase" refers to the bulk phase in which the electrically conductive particles are dispersed. A continuous polymer phase may contain the first and second thermoplastic distributed co-continuously or non-co-continuously within one another. In a co-continuous distribution of the first and second thermoplastic polymers, the first and second thermoplastic polymers may exist as separate, continuous polymer matrices that are interblended with each other. The first and second thermoplastic polymers may define an interpenetrating network of the two thermoplastic polymers in some instances, wherein there is connectivity between at least a majority of the first thermoplastic polymer and connectivity between at least a majority of the second thermoplastic polymer throughout the continuous polymer phase. In a non-co-continuous distribution of the first and second thermoplastic polymers, in contrast, isolated pockets of one of the thermoplastic polymers may exist in a continuous matrix of the other. Thus, in a co-continuous distribution, any cross-section of the polymer composite contains at least some of both the first thermoplastic polymer and the second thermoplastic polymer. Composites containing regions that are separately co-continuous or non-co-continuous also are within the scope of the present disclosure. Since the thermoplastic polymers are immiscible with one another (including physical blends of the first thermoplastic polymer and the second thermoplastic polymer), removal of one of the polymers may afford controlled porosity or channel introduction into a printed part. Very fine porosity features may be realized, much smaller than those that might be attainable through direct printing. In non-limiting examples, one of the thermoplastic polymers is a water-soluble polymer and the other thermoplastic polymer is a water-insoluble polymer. In other instances, one of the thermoplastic polymers is dissolvable in an organic solvent and the other thermoplastic polymer is not soluble in the same organic solvent (but may be soluble in a different organic solvent). In still other instances, one of the thermoplastic polymers may be degraded to byproducts that separate from the composite, wherein conditions promoting degradation do not impact the other thermoplastic polymer. Degradation by melting which removes one of the thermoplastic polymers from the other also resides within the scope of the present disclosure. By altering the ratio of the dissolvable/degradable thermoplastic polymer to the other thermoplastic polymer in the composite, the extent of porosity may be regulated to a desired degree, thereby also impacting the piezoresistivity that may be realized. Advantageously, the electrically conductive particles may remain well-distributed in the composite filaments following formation thereof.

It is also to be appreciated that the first thermoplastic polymer and the second thermoplastic polymer need not necessarily comprise a single polymer of each type. Thus, depending on application-specific needs, the first thermoplastic polymer may comprise one or more thermoplastic polymers, such as two thermoplastic polymers that are dissolvable or degradable under specified conditions, and the second thermoplastic polymer may comprise one or more thermoplastic polymers, such as two thermoplastic polymers that are non-dissolvable or non-degradable under the specified conditions.

Surprisingly and advantageously, the electrically conductive particles may remain substantially associated with or located in the thermoplastic polymer that remains undissolved or non-degraded, thus experiencing minimal loss when the dissolvable or degradable polymer is removed (e.g., through exposure to an appropriate solvent or other conditions that may promote removal of one of the thermoplastic polymers in preference to the other). Accordingly, a porous network of the electrically conductive particles distributed in the remaining thermoplastic polymer (e.g., the insoluble or non-degradable thermoplastic polymer) may be realized after printing and further processing. The electrically conductive particles may be uniformly distributed in the remaining thermoplastic polymer defining the porous network.

Advantageously, composites capable of forming printed parts having piezoresistive behavior may be formulated using a room temperature aqueous-based process employing a water-soluble polymer. Polyvinyl alcohol (PVA), polyethylene glycol (PEG, also known as polyethylene oxide), or any combination thereof may be combined with electrically conductive particles in an aqueous phase containing a second thermoplastic polymer that is suspended in the aqueous phase and with which the water-soluble polymer is immiscible. After removal of the water from the combined aqueous phase, the two thermoplastic polymers may form a continuous polymer phase, in which the two thermoplastic polymers remain mutually immiscible with one another, and in which the electrically conductive particles are distributed throughout the continuous polymer phase while being substantially located in the second thermoplastic polymer (i.e., the water-insoluble polymer). In one example, the continuous polymer network and electrically conductive particles therein may be obtained as a cast film before being processed into a continuous filament. As discussed above, after removing water from the combined aqueous phase, the electrically conductive particles, even though being distributed throughout the continuous polymer phase, surprisingly are located predominantly within the polymer that is not water-soluble. Therefore, once formed into a printed part, the water-soluble polymer may be removed to afford a porous polymer network but without releasing substantial quantities of the electrically conductive particles. Composite residue obtained from the composite film (e.g., obtained after drying and shredding/pulverization) may be converted into a continuous filament through extrusion. Subsequent removal of the water-soluble polymer may generate a porous polymer network of the remaining thermoplastic polymer and distributed electrically conductive particles, either before or after printing. Thus, the continuous filament (composite filament) or a printed part obtained therefrom may have porosity defined therein through removal of the water-soluble polymer. In either case, the porous polymer network may be capable of exhibiting piezoresistive behavior.

Although composite filaments may be particularly advantageous when formed according to the disclosure herein, it is to be realized that composite residue (e.g., shreds) obtained from film casting, breakup, and optional further processing may also be useful for similar printing processes or as a precursor to the composite filaments suitable for fused filament fabrication. The composite residue obtained from an intermediate composite film may be utilized directly or extruded under conditions effective to provide a fiber form larger than a composite filament. The larger fiber form may then be cut, pulverized, or the like to afford composite pellets likewise containing electrically conductive particles distributed in a continuous polymer phase comprising a mixture of immiscible thermoplastic polymers. Like composite filaments, composite pellets or similar non-filamentous composite materials may be subsequently processed into printed parts having piezoresistive properties under suitable additive manufacturing conditions. Porosity may be introduced into the printed parts to induce or increase the piezoresistive behavior.

Figure 2:
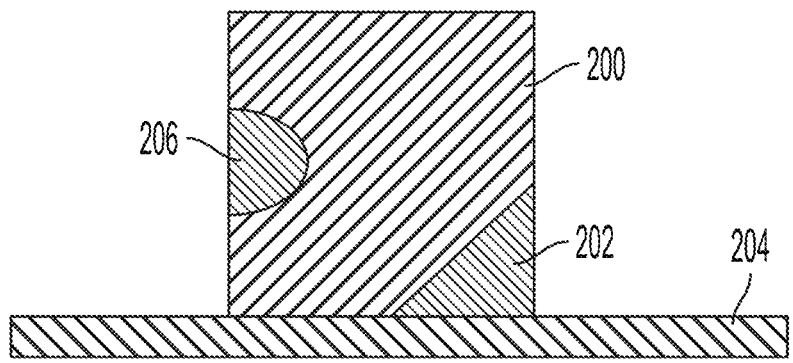
FIG. 2 shows a schematic of an illustrative part having overhangs.

Before addressing various aspects of the present disclosure in further detail, a brief discussion of additive manufacturing processes, specifically fused filament fabrication processes, will first be provided so that the features of the present disclosure can be better understood. FIG. 1 shows a schematic of an illustrative fused filament fabrication process for producing a part using a build material and a removable support material. As shown in FIG. 1, print head 100 includes first extruder 102a and second extruder 102b, which are each configured to receive a filamentous printing material. First extruder 102a is configured to receive first filament 104a from first payout reel 106a and provide molten stream 108a of a first printing material, and second extruder 102b is configured to receive second filament 104b from second payout reel 106b and provide molten stream 108b of a second printing material. Both molten streams are initially deposited upon a print bed (not shown in FIG. 1) to promote layer-by-layer growth of supported part 120. The first printing material (build material) supplied by first extruder 102a may comprise a composite filament of the present disclosure (e.g., a continuous filament containing electrically conductive particles distributed in a continuous polymer phase comprising mutually immiscible thermoplastic polymers) used to fabricate part 110, and the second printing material (removable support material) supplied by second extruder 102b may be a dissolvable or degradable polymer, which is used to fabricate removable support 112 under overhang 114. Overhang 114 is not in direct contact with the print bed or a lower printed layer formed from the build material. Since overhang 114 may not be deposited in free space, removable support 112 is provided as a temporary structure for deposition of part 110 thereon. In the part arrangement shown in FIG. 1, removable support 112 is interposed between overhang 114 and the print bed, but it is to be appreciated that in alternatively configured parts, removable support 114 may be interposed between two or more portions of part 110. FIG. 2, for example, shows illustrative part 200, in which removable support 202 is interposed between an overhang defined between part 200 and print bed 204, and removable support 206 is interposed between two portions of part 200.

Referring again to FIG. 1, once printing of part 110 and removable support 112 is complete, supported part 120 may be subjected to support removal conditions 125 that result in elimination of removable support 112 (e.g., dissolution or disintegration conditions, or the like) and leave part 110 with overhang 114 unsupported thereon. Support removal conditions 125 may include contact of supported part 120 with a solvent in which removable support 112 is dissolvable or degradable and part 110 is not. Support removal conditions 125 may also promote degradation or dissolution of one of the thermoplastic polymers in the continuous polymer phase as well, thereby leaving electrically conductive particles dispersed in the remaining thermoplastic polymer defined as a porous network.

Figure 3:
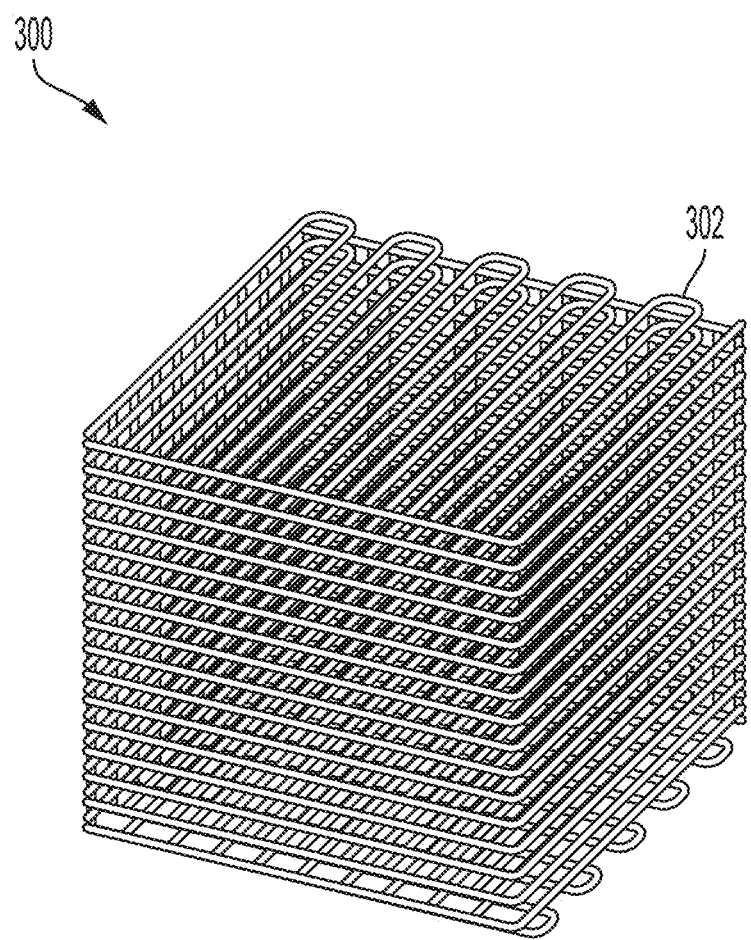
FIG. 3 shows a schematic of an illustrative part defined as a porous network of a continuous polymer matrix.

FIG. 3 shows a schematic of illustrative part 300 defined as a porous network formed from continuous polymer matrix 302. When continuous polymer matrix 302 contains electrically conductive particles in a suitably distributed state, enhanced piezoresistive behavior may be observed.

Although the additive manufacturing process shown in FIG. 1, in principle, might be modified to introduce porosity into a printed part (such as illustrative part 300 in FIG. 3) for purposes of inducing or increasing piezoresistive behavior therein, doing so may be problematic in various aspects. It may be difficult to introduce fine porosity features with co-extruded build and removable support materials, and co-extrusion in this manner may significantly increase the time needed to complete a printing process. Printing of a part having porosity defined therein as a regular array (such as present in part 300 in FIG. 3) may also be accomplished using a single print head depositing a suitable build material, but resolution of the printing process may similarly limit the pores or channels to excessively large sizes, and the printing process may significantly increase in complexity.

It is to be appreciated that when printed parts having an overhang are formed using the composite filaments of the present disclosure, removable supports similar to removable support 114 in FIG. 1 may be introduced, as needed, to facilitate fabrication of the printed part. The dissolvable or degradable material (sacrificial material) defining the removable support may comprise the same or different dissolvable or degradable thermoplastic polymer comprising a portion of the as-printed polymer matrix defining the part. Moreover, the dissolvable or degradable polymer in the as-printed polymer matrix defining the part may be removed to define porosity in the printed part under the same or different conditions to those used for eliminating a removable support to define an overhang. Definition of porosity within the printed part and elimination of the removable support may take place in any order, including definition of porosity and elimination of the removable support at substantially the same time.

Accordingly, composite filaments of the present disclosure may be suitable for use in fused filament fabrication and comprise a continuous polymer phase comprising a first thermoplastic polymer and second thermoplastic polymer that are immiscible with one another, and a plurality of electrically conductive particles distributed in the continuous polymer phase, in which the plurality of electrically conductive particles may comprise microparticles, nanoparticles, or any combination thereof. The first thermoplastic polymer may be dissolvable or degradable under specified conditions, and the second thermoplastic polymer may be insoluble or non-degradable under the specified conditions. Examples of dissolvable or degradable thermoplastic polymers, insoluble or non-degradable thermoplastic polymers, and electrically conductive particles are provided hereinafter.

The continuous polymer phase or the electrically conductive particles may constitute a majority component or a minority component of the composite filaments disclosed herein. In various embodiments, the electrically conductive particles may be present in the continuous polymer phase at a particle:polymer weight ratio ranging from about 10:90 to about 95:5 or any subrange in between, based on total composite weight with both thermoplastic polymers present. These weight percentages correspond to a particle volume percentage ranging from about 1.2 vol. % to about 68 vol. %. The foregoing volume percentages are likewise based upon total composite volume before removal of one of the thermoplastic polymers and presume a particle density of 10.49 g/cm$^3$ for Ag particles. Other types of electrically conductive particles may be present in similar volume percentage ranges. In more specific examples, the weight ratio of electrically conductive particles to continuous polymer phase in the composite filaments may range from about 20:80 (3 vol. % Ag particles) to about 80:20 (62 vol. % Ag particles), or about 30:70 (5 vol. % Ag particles) to about 70:30 (21 vol. % Ag particles), or about 40:60 (7 vol. % Ag particles) to about 60:40 (15 vol. % Ag particles), based on total composite weight with both thermoplastic polymers present. Following removal of one of the thermoplastic polymers, the volume percentage range for the electrically conductive particles may range from about 2 vol. % to about 80 vol. %. A maximum loading of the electrically conductive particles may be chosen such that the composite filament maintains structural integrity as a continuous filament and remains printable by fused filament fabrication. In addition, the loading of electrically conductive particles may be selected such that a printed part has desired mechanical properties and/or a desired degree of piezoresistivity following removal of one of the thermoplastic polymers. The electrically conductive particles may be distributed within the continuous polymer phase in a manner such that the electrically conductive particles remain substantially dispersed as individuals, both in the composite filament or a printed part obtained therefrom. The distribution of the electrically conductive particles in the continuous polymer phase may be substantially uniform in portions of the continuous polymer phase where the electrically conductive particles are present (e.g., a substantially uniform distribution of the electrically conductive particles within the non-degradable or non-dissolvable thermoplastic polymer).

The ratio of the first thermoplastic polymer to the second thermoplastic polymer may likewise vary over a wide range. In non-limiting examples, a ratio of the first thermoplastic polymer to the second thermoplastic polymer may range from about 1:99 to about 99:1 by weight. In more specific examples, the ratio of the first thermoplastic polymer to the second thermoplastic polymer may range from about 10:90 to about 90:10, or about 20:80 to about 80:20, or about 30:70 to about 70:30, or about 40:60 to about 60:40, or about 10:90 to about 20:80, or about 20:80 to about 30:70, or about 30:70 to about 40:60, or about 40:60 to about 50:50, or about 50:50 to about 60:40, or about 60:40 to about 70:30, or about 70:30 to about 80:20, or about 80:20 to about 90:10. The ratio of the first thermoplastic polymer to the second thermoplastic polymer may be selected such that a desired extent of flexibility is realized once a printed part is formed and the first thermoplastic polymer is removed, or to tailor the extent of porosity formed in the printed part. Similarly, the ratio may be tailored to facilitate formation of the composite filament and/or printing therewith prior to removal of one of the thermoplastic polymers. Based on the degree of porosity formed, the piezoresistive behavior may vary accordingly. Piezoresistive behavior may be observed by a decrease in resistance as a higher mechanical load (weight) is borne by the continuous polymer phase or a printed part formed therefrom. Increased or emergent piezoresistivity may be observed after removal of at least a portion of the first thermoplastic polymer from a printed part.

After removal of at least a portion of the first thermoplastic polymer from a printed part, the printed parts may have a degree of porosity commensurate with the amount of the first thermoplastic polymer that is removed. In non-limiting embodiments, the printed parts may have a porosity ranging from about 5% to about 80%, or about 10% to about 50%, or about 30% to about 70%, based upon the amount of mass removed relative to the total mass of a printed part prior to removal of the first thermoplastic polymer. The pore size or the channel size of interconnected pores may depend upon the extent of dispersion of the first thermoplastic polymer in the continuous polymer phase, as well as the amount of the first thermoplastic polymer that is removed.

Once the first thermoplastic polymer has been at least partially removed from a printed part, the electrically conductive particles may be present in a printed polymer matrix comprising the second thermoplastic polymer (the remaining thermoplastic polymer) at a particle:polymer mass ratio of about 20:80 to about 97:3, based on total mass of the part following removal of the first thermoplastic polymer. These values correspond to a particle:polymer volume percentage ranging from about 2 vol. % to about 80 vol. %.

Electrically conductive particles suitable for use in any embodiment of the disclosure herein may have an average particle size in a micrometer or nanometer size range, or a combination of micrometer- and nanometer-size electrically conductive particles may be used. In more particular examples, suitable electrically conductive particles may have a diameter of about 25 microns or less, or about 10 microns or less, such as about 1 micron to about 10 microns, or about 2 microns to about 8 microns. Smaller electrically conductive particles, such as those having an average particle size of about 100 nm or under or an average particle size of about 500 nm or under, such as average particle size of about 10 nm to about 100 nm, or about 20 nm to about 80 nm, or about 100 nm to about 500 nm, may also be utilized in the disclosure herein, either alone or in combination with larger electrically conductive particles in the micrometer-size range. Average particle sizes in the disclosure herein represent $D_{50}$ values, which refers to a diameter at which 50% of the sample (on a volume basis unless otherwise specified) is comprised of particles having a diameter less than said diameter. $D_{50}$ may also be referred to as the "average particle size." Such average particle size measurements may be made by analysis of optical images, including via SEM analysis, or using onboard software of a Malvern MASTERSIZER 3000 Aero S instrument, which uses light scattering techniques for particle size measurement.

Electrically conductive particles suitable for use in the disclosure herein may comprise a metal, a carbonaceous conductor, or any combination thereof. Metals that may comprise the electrically conductive particles include, but are not limited to, high-conductivity metals such as silver, copper, aluminum, gold, and the like. Illustrative forms of electrically conductive particles comprising a metal may include, for example, nanoparticles, nanoflakes, nanowires, nanorods, microflakes, and the like, such as silver nanoparticles, silver nanoflakes, silver microflakes, silver nanowires, silver nanorods, aluminum microflakes, aluminum nanowires, copper microflakes, copper nanoparticles, copper nanowires, gold nanoparticles, the like, or any combination thereof. Carbonaceous conductors that may be used alone or in combination with one or more electrically conductive particles comprising a metal may include, but are not limited to, carbon black, carbon fibers, graphene, carbon nanotubes, the like, or any combination thereof.

Once processed into a composite filament and/or after formed into a printed part, the electrically conductive particles may be distributed substantially as individuals in the continuous polymer phase. In various embodiments, at least a majority of the electrically conductive particles may be located in or otherwise associated with the second thermoplastic polymer in the continuous polymer phase. The extent of localization with or association between the electrically conductive particles and the second thermoplastic polymer may be determined based upon the amount of electrically conductive particles lost upon dissolution or degradation of the first thermoplastic polymer when establishing porosity in the disclosure herein. In non-limiting examples, at least about 80%, at least about 85%, at least about 90%, or at least about 95% of the electrically conductive particles originally blended with the continuous polymer phase may remain associated with the second thermoplastic polymer once the first thermoplastic polymer has been removed.

In some examples, the first thermoplastic polymer may be water-soluble and the second thermoplastic polymer may be water-insoluble. Examples of water-soluble thermoplastic polymers suitable for use in the disclosure herein may include, for example, polyvinyl alcohol, polyethylene glycol, any copolymer thereof, or any combination thereof. Some or other examples of suitable first thermoplastic polymers may include, but are not limited, to a polyvinylpyrrolidone, a polyoxazoline (e.g., poly(2-ethyl-2-oxazoline)), a cellulose ester, a polylactic acid, a polylactate, a polycaprolactone, any copolymer thereof, or any combination thereof. Solubility or degradation in aqueous acid solutions is also included within the scope of water solubility in the disclosure herein. Polylactic acid may be effectively degraded through contact with an aqueous acid. Polylactic acid may also be used effectively as a build material in the disclosure herein (i.e., as the second thermoplastic polymer). If polylactic acid is used as the second thermoplastic polymer, the specified conditions for dissolving or degrading the first thermoplastic polymer may be chosen so as not to degrade the polylactic acid (i.e., non-acidic conditions). Similar considerations apply to polyesters like polycaprolactones, which may likewise be degradable under aqueous acid conditions but may be suitably used as a second thermoplastic polymer if the first thermoplastic polymer is removed under conditions that do not promote their degradation.

A wide range of thermoplastic polymers may be utilized as the second thermoplastic polymer in the disclosure herein. Any thermoplastic polymer may constitute a suitable second thermoplastic polymer, provided that the second thermoplastic polymer is insoluble and/or non-degradable under the specified conditions at which the first thermoplastic polymer is dissolvable or degradable. The second thermoplastic polymer may also be selected based upon printing feasibility and the physical properties of the printed part obtained following removal of the first thermoplastic polymer. Suitable thermoplastic polymers usable as the second thermoplastic polymer may exhibit a softening temperature or melting point sufficient to facilitate deposition (printing) at a temperature ranging from about 50° C. to about 400° C., or about 70° C. to about 275° C., or from about 100° C. to about 200° C., or from about 175° C. to about 250° C. Melting points may be determined using ASTM E794-06 (2018) with a 10° C. ramping and cooling rate, and softening temperatures may be determined using ASTM D6090-17.

Illustrative examples of thermoplastic polymers usable as the second thermoplastic polymer in the disclosure herein may include, for instance, a polyamide, a polycaprolactone, a polylactic acid, a poly(styrene-isoprene-styrene) (SIS), a poly(styrene-ethylene-butylene-styrene) (SEBS), a poly(styrene-butylene-styrene) (SBS), a high-impact polystyrene (HIPS), polystyrene, a thermoplastic polyurethane (TPU), a poly(acrylonitrile-butadiene-styrene) (ABS), a polymethylmethacrylate, a poly(vinylpyrrolidine-vinylacetate), a polyester, a polycarbonate, a polyethersulfone, a polyoxymethylene, a polyether ether ketone, a polyetherimide, a polyethylene, a polyethylene oxide, a polyphenylene sulfide, a polypropylene, a polystyrene, a polyvinyl chloride, a poly(tetrafluoroethylene), a poly(vinylidene fluoride), a poly(vinylidene fluoride-hexafluoropropylene), polyvinylpyrrolidone-co-polyvinyl acetate (PVP-co-PVA), any copolymer thereof, and any combination thereof. Although some of the foregoing second thermoplastic polymers are water-soluble, they may still be utilized as the second (insoluble and/or non-degradable) thermoplastic polymer if the first (soluble and/or degradable polymer) is removed under non-aqueous conditions (e.g., through dissolution with an organic solvent).

In some embodiments, the second thermoplastic polymer, which remains associated with the electrically conductive particles following removal of the first thermoplastic polymer, may itself be an electrically conductive polymer. By having electrically conductive particles distributed in an electrically conductive polymer defining a porous network, further enhanced piezoresistive behavior may be realized. Suitable electrically conductive polymers may include, but are not limited to, polyacetylenes, polyanilines, polypyrroles, polythiophenes (including, poly-(3,4-ethylenedioxythiophene), PEDOT), polyphenylenes and other polyarylenes, polyphenylene vinylenes, and the like. Such electrically conductive polymers may also be blended with non-conductive thermoplastic polymers as well.

Preferably, the polymer composites and composite filaments of the present disclosure may be substantially free of thermosetting polymers, including uv-curable resins and similar resins capable of forming thermosetting polymers.

In non-limiting examples, the composites of the present disclosure may be obtained under aqueous processing conditions to afford electrically conductive particles distributed in a continuous polymer matrix comprising the first thermoplastic polymer and the second thermoplastic polymer. In some embodiments, the composites may be obtained in the form of a film before subsequently being processed into a composite filament. After obtaining the composites, the composites may be processed into a composite filament (e.g., through extrusion) suitable for conducting fused filament fabrication, processed into a larger composite fiber or filament, converted into pellets, and/or used directly in the form of a shredded or pulverized composite film (e.g., composite pieces). Suitable extrusion conditions may take place above the melting point or softening temperature of the continuous polymer matrix with a single- or twin-screw extruder, for example.

In some embodiments, electrically conductive particles may be combined with an aqueous dispersion of the second thermoplastic polymer. Thereafter, the first thermoplastic polymer (e.g., a water-soluble polymer) may be added to the aqueous dispersion. Water may be evaporated to form a composite film, which may then be extruded into a filament.

In other embodiments, electrically conductive particles may be combined with an aqueous dispersion of the second thermoplastic polymer. Thereafter, the water may be evaporated, and the first thermoplastic polymer (e.g., a water-soluble polymer) may be combined with the residue, which may then be blended together to form the composite. A composite filament may then be obtained by extrusion thereafter.

Accordingly, in some embodiments, methods for forming a composite according to the disclosure herein may comprise combining a plurality of electrically conductive particles and a first thermoplastic polymer that is water-soluble (or alternately degradable under specified conditions) with an aqueous dispersion of a second thermoplastic polymer that is water-insoluble (or alternately non-degradable under the specified conditions at which the first thermoplastic polymer is dissolvable or degradable) to provide a combined aqueous mixture; and removing water from the combined aqueous mixture to provide a composite residue comprising at least a portion of the electrically conductive particles distributed in a continuous polymer phase comprising the first thermoplastic polymer and the second thermoplastic polymer, in which the first thermoplastic polymer and the second thermoplastic polymer may remain immiscible with one another in the continuous polymer phase.

In alternative procedures, the first thermoplastic polymer may be at least partially replaced with dissolvable or degradable particles that may undergo separation or removal from the second thermoplastic polymer under specified conditions. Liquids that are removal under specified conditions may similarly at least partially replace the first thermoplastic polymer, provided that a blend of the liquid, the second thermoplastic polymer, and the conductive particles retains the capability for being processed into a continuous filament according to the disclosure herein. Dissolvable or degradable particles or liquids may undergo degradation or removal under similar conditions to those used for promoting degradation or removal of the first thermoplastic polymer. In non-limiting examples, dissolvable or degradable particles or liquids may be water-soluble, and the second thermoplastic polymer may be water-insoluble under specified conditions.

In still another embodiment, gas-forming substances may be utilized to introduce porosity in a continuous polymer matrix comprising the second thermoplastic polymer. In particular, the first thermoplastic polymer may be at least partially replaced with the gas-forming substance (e.g., microspheres containing a gas or a material that degrades to a gas under specified conditions) and combined with the second thermoplastic polymer. Formation of gas within the second thermoplastic polymer may result in bubble formation and definition of porosity therein once processing takes place under suitable conditions.

The composite residue may be utilized directly in the form of shreds or a pulverized film (e.g., when the combined aqueous mixture is cast as a composite film and water is evaporated therefrom). In further embodiments, the composite residue may be extruded into a composite filament suitable for fused filament fabrication or a composite fiber having an even larger diameter, in which the electrically conductive particles are distributed in the continuous polymer phase. If desired, a larger composite fiber may be cut or similarly processed into composite pellets having the electrically conductive particles similarly distributed in the continuous polymer phase. In some embodiments, the composite film may be broken up (e.g., by shredding or pulverizing) after evaporating water therefrom into a plurality of composite pieces, and extruding the composite pieces to form a composite filament.

Optionally, the composite or the composite filament obtained in accordance with foregoing may be processed to remove at least a portion of the first thermoplastic polymer therefrom, thereby defining porosity in the continuous polymer phase. Such composite filaments may comprise the second thermoplastic polymer defined as a porous polymer network with the electrically conductive particles distributed therein. Further optionally, once the porosity has been defined in the foregoing manner, pores or channels within the porous polymer network may be backfilled with one or more additives to modify the composite properties still further, such as additional electrically conductive particles, thermally conductive particles, reinforcement fibers, colorants, stabilizers, plasticizers, and the like. Such additives may be introduced in a liquid solution or dispersion, which is subsequently evaporated once backfilling has taken place.

Once composite filaments have been formed in accordance with the disclosure herein, the composite filaments may be deposited layer-by-layer above a softening temperature thereof to form a printed part having a specified shape. After printing, the printed part may comprise a continuous polymer matrix comprising the first thermoplastic polymer and the second thermoplastic polymer that remain immiscible with one another, and a plurality of electrically conductive particles distributed in the continuous printed polymer matrix.

At least a majority of the electrically conductive particles may be substantially located in or associated with the second thermoplastic polymer, such that the first thermoplastic polymer may be removed from the printed part through dissolution or degradation (e.g., through water-solubility) without also removing a significant fraction of the electrically conductive particles. After removing the first thermoplastic polymer from the continuous printed polymer matrix, a printed part having porosity defined therein may be obtained. In particular, such printed parts may exhibit piezoresistivity and comprise a printed polymer matrix having porosity defined therein and comprising a plurality of electrically conductive particles distributed in a thermoplastic polymer (e.g., the second thermoplastic polymer remaining after dissolution or degradation of the first thermoplastic polymer). Suitable types of printed parts having piezoresistive behavior are not considered to be particularly limited in the present disclosure.

Optionally, the resulting porosity in a printed part may be backfilled with one or more additional additives. Such backfilling may take place in a similar manner to that described above in regard to backfilling a porous composite filament.

Embodiments disclosed herein include:

A. Composite filaments, which may be suitable for additive manufacturing. The composite filaments comprise: a continuous polymer phase comprising a first thermoplastic polymer and a second thermoplastic polymer that are immiscible with one another; wherein the first thermoplastic polymer is dissolvable or degradable under specified conditions, and the second thermoplastic polymer is insoluble or non-degradable under the specified conditions; and a plurality of electrically conductive particles distributed in the continuous polymer phase, the plurality of electrically conductive particles comprising microparticles, nanoparticles, or any combination thereof.

A1. Composites. The composites comprise: a continuous polymer phase comprising a first thermoplastic polymer and a second thermoplastic polymer that are immiscible with one another; wherein the first thermoplastic polymer is dissolvable or degradable under specified conditions, and the second thermoplastic polymer is insoluble or non-degradable under the specified conditions; and a plurality of electrically conductive particles distributed in the continuous polymer phase, the plurality of electrically conductive particles comprising microparticles, nanoparticles, or any combination thereof. Optionally, the first thermoplastic polymer and the second thermoplastic polymer may have a co-continuous distribution in the continuous polymer phase.

A2. Composite pellets. The composite pellets comprise: a continuous polymer phase comprising a first thermoplastic polymer and a second thermoplastic polymer that are immiscible with one another; wherein the first thermoplastic polymer is dissolvable or degradable under specified conditions, and the second thermoplastic polymer is insoluble or non-degradable under the specified conditions; and a plurality of electrically conductive particles distributed in the continuous polymer phase, the plurality of electrically conductive particles comprising microparticles, nanoparticles, or any combination thereof. Optionally, the first thermoplastic polymer and the second thermoplastic polymer may have a co-continuous distribution in the continuous polymer phase.

B. Printed parts comprising immiscible polymers. The printed parts comprise: a continuous printed polymer matrix comprising a first thermoplastic polymer and a second thermoplastic polymer that are immiscible with one another; wherein the first thermoplastic polymer is dissolvable or degradable under specified conditions, and the second thermoplastic polymer is insoluble or non-degradable under the specified conditions; and a plurality of electrically conductive particles distributed in the continuous printed polymer matrix, the plurality of electrically conductive particles comprising microparticles, nanoparticles, or any combination thereof. Optionally, the first thermoplastic polymer and the second thermoplastic polymer may have a co-continuous distribution in the continuous printed polymer matrix.

C. Printed parts having piezoresistivity. The printed parts comprise: a printed polymer matrix having porosity defined therein and comprising a plurality of electrically conductive particles distributed in a thermoplastic polymer.

D. Methods for forming composite filaments. The methods comprise: combining a plurality of electrically conductive particles and a first thermoplastic polymer that is water-soluble with an aqueous dispersion of a second thermoplastic polymer that is water-insoluble to provide a combined aqueous mixture; removing water from the combined aqueous mixture to provide a composite residue comprising at least a portion of the electrically conductive particles distributed in a continuous polymer phase comprising the first thermoplastic polymer and the second thermoplastic polymer, the first thermoplastic polymer and the second thermoplastic polymer being immiscible with one another in the continuous polymer phase; and extruding the composite residue into a composite filament comprising the electrically conductive particles distributed in the continuous polymer phase. Optionally, the first thermoplastic polymer and the second thermoplastic polymer may have a co-continuous distribution in the continuous polymer phase.

E. Printing methods. The methods comprise: providing the composite filament of A; and depositing the composite filament layer-by-layer above a softening temperature thereof to form a printed part.

Each of embodiments A-E may have one or more of the following additional elements in any combination:

Element 1: wherein the first thermoplastic polymer is water-soluble and the second thermoplastic polymer is water-insoluble.

Element 2: wherein at least a majority of the electrically conductive particles are located in the second thermoplastic polymer in the continuous polymer phase or in the continuous printed polymer matrix.

Element 2A: wherein the first thermoplastic polymer and the second thermoplastic polymer have a co-continuous distribution.

Element 3: wherein the first thermoplastic polymer comprises polyvinyl alcohol, polyethylene glycol, or any combination thereof.

Element 4: wherein the electrically conductive particles are present in the continuous polymer phase at a particle:polymer weight ratio ranging from about 10:90 to about 95:5, based on total composite mass.

Element 5: wherein a ratio of the first thermoplastic polymer to the second thermoplastic polymer ranges from about 30:70 to about 70:30 by weight.

Element 6: wherein the electrically conductive particles have an average particle size of about 10 microns or less.

Element 7: wherein at least a portion of the electrically conductive particles have an average particle size of about 100 nm or less.

Element 8: wherein the electrically conductive particles comprise a metal, a carbonaceous conductor, or any combination thereof.

Element 9: wherein the electrically conductive particles are present in the printed polymer matrix at about 2 vol. % to about 20 vol. %, based on total volume of the printed polymer matrix.

Element 10: wherein removing water from the combined aqueous mixture comprises casting the combined aqueous mixture as a composite film, and evaporating the water.

Element 11: wherein the method further comprises breaking up the composite film into a plurality of composite pieces after evaporating the water therefrom, and extruding the composite pieces to form the composite filament.

Element 12: wherein the method further comprises removing at least a portion of the first thermoplastic polymer from the printed part to introduce porosity thereto.

By way of non-limiting example, exemplary combinations applicable to A-E include, but are not limited to: 1, and 2 or 2A; 1 and 3; 1 and 4; 1 and 5; 1 and 6; 1 and 7; 1 and 8; 2 or 2A, and 3; 2-4; 2A, 3 and 4; 2 or 2A, 3 and 5; 2 or 2A, 3 and 6; 2 or 2A, 3 and 7; 2 or 2A, 3 and 8; 3 and 4; 3 and 5; 3 and 6; 3 and 7; 3 and 8; 4 and 5; 4 and 6; 4 and 7; 4 and 8; 5 and 6; 5 and 7; 5 and 8; 6 or 7, and 8; any of 1-8, and 9; any of 1-9, and 10; any of 1-10, and 11; 10 and 11; and any of 1-11, and 12.

To facilitate a better understanding of the present disclosure, the following examples of preferred or representative embodiments are given. In no way should the following examples be read to limit, or to define, the scope of the invention.

EXAMPLES

Composite Film Formation. The following general procedure was utilized to prepare composite films that may be further processed into composite filaments. Silver microflakes were combined with an aqueous polymer dispersion, and the aqueous polymer dispersion was combined with a solution of a water-soluble polymer. The resulting combined aqueous mixture was cast as a film, and the water was evaporated. The resulting composite residue was analyzed, and optionally ground and extruded into a composite filament.

Silver microflakes (~2-4 μm) were purchased from Inframat Advanced Materials, LLC. Thermoplastic Polyurethane (TPU) emulsions (Alberdingk U 615) were purchased from Alberdingk Boley Inc. Polyvinyl Alcohol (PVA, SELVOL™ E 203S, a low viscosity partially hydrolysed polyvinyl alcohol) was purchased from Sekisui Specialty Chemicals. Poly(ethylene glycol) (PEG) having an average molecular weight (Mn) of 35,000 was purchased from Sigma-Aldrich, Inc.

Example 1: Base Piezoresistive Formulation without Water-Soluble Polymer. One gram of silver microflakes were combined with 1.25 g of TPU emulsion, and the resulting mixture was rolled on a movil rod roller for 4 hours to mix thoroughly. Films were cast by pouring the mixture into trays. Water from the mixture was evaporated under ambient conditions in a fume hood, under vacuum overnight, or in an oven at 60° C. for 2 hours. After drying, the mass ratio of silver microflakes to TPU was 2:1.

Example 2: Piezoresistive Formulation with PVA. Example 1 was repeated, except 1.0 g of a 25 wt. % solution of PVA was combined with the mixture of silver microflakes and TPU. After drying, the mass ratio of silver microflakes to TPU to PVA was 4:2:1.

At larger scale, processing was conducted by mixing 180 g of silver microflakes with 225 g Alberdink U 615 TPU emulsion (90 g TPU solids), and rolling the mixture on a movil rod roller for 4 hours. Films were cast by pouring the rolled mixture onto trays and removing the water under ambient conditions, under reduced pressure, or in an oven at 60° C. for 2 hours. The dried material was ground into small pieces and further dried overnight at 40° C. under reduced pressure. 90 g of the further dried material (representing 60 g silver microflakes and 30 g TPU) was combined with 15 g PVA and compounded at 180° C. in a Haake mixer. Filaments were successfully extruded from the material produced under scale up conditions.

Example 3: Sonicated Film of Example 2. The dried film of Example 2 was sonicated in water for 3 hours to remove the PVA. Sonication was conducted with a Branson 1510 ultrasonic bath.

Example 4: Piezoresistive Formulation with PEG. Example 1 was repeated, except 0.25 g of a 40 wt. % solution of PEG was combined with the mixture of silver microflakes and TPU. After drying, the mass ratio of silver microflakes to TPU to PEG was 4:2:1.

The scale up synthesis of Example 2 was conducted, except substituting PEG for PVA. After compounding, the resulting mixture had a mass ratio of silver microflakes to TPU to PEG of 4:2:1. Filaments were successfully extruded from the material produced under scale up conditions.

Example 5: Sonicated Film of Example 4. The dried film of Example 4 was sonicated 3 hours to remove the PVA. Sonication was conducted with a Branson 1510 ultrasonic bath.

SEM Characterization of Composite Films. After drying, there were some easily-removable silver microflakes remaining on the surface of the films, but the majority of the silver microflakes remained dispersed in the continuous polymer phase. Addition of PVA or PEG had little impact on the dispersion stability.

Figure 7A:
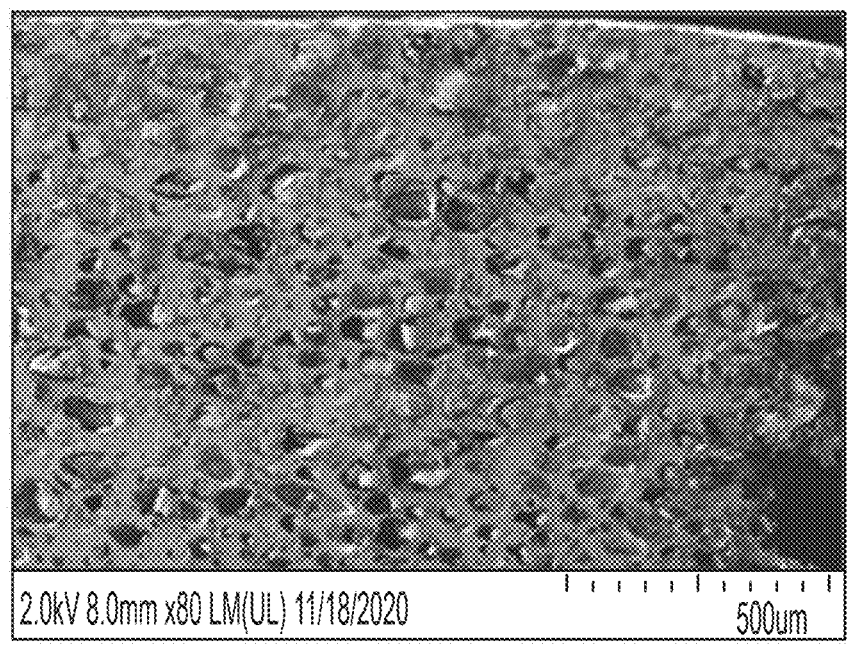
FIGS. 7A and 7B show SEM images of a silver microflake/TPU composite film (Example 1) at two different magnifications.
Figure 7B:
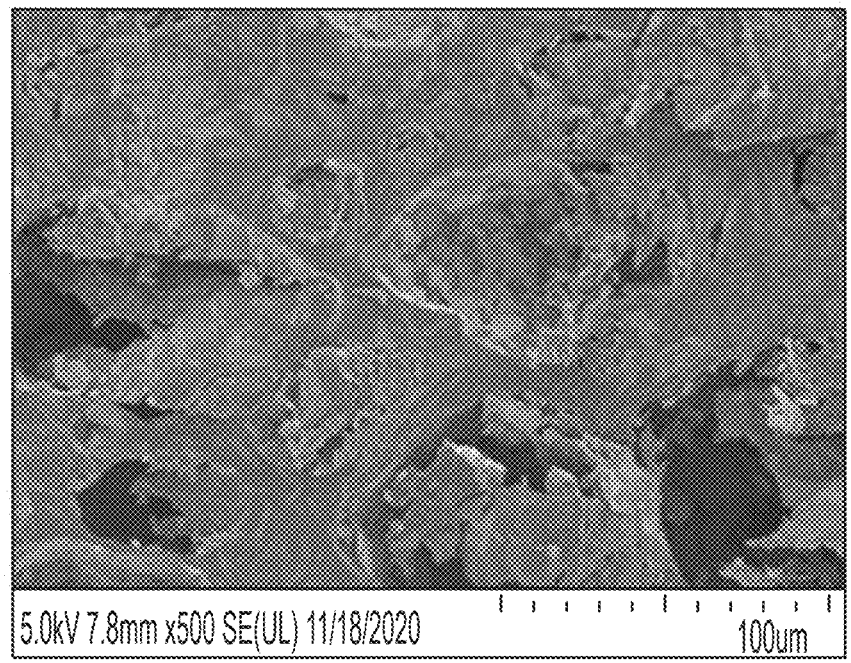

The product from Example 1 was analyzed by scanning electron microscopy (SEM). Cross-sectional SEM images showed a good distribution of the silver microflakes in the composite matrix. The SEM images are shown in FIGS. 7A and 7B and are discussed below in reference to composite filaments prepared therefrom.

Ash Analysis of Composite Films. The silver content of the films of Examples 1-5 was determined by ash analyses, which are summarized in Table 1 below.

TABLE 1

| Example No. | Polymer | Experimental Silver Content (%) | Theoretical Silver Content (%) |
|---|---|---|---|
| 1 | TPU | 60.0 | 66.7 |
| 2 | TPU:PVA | 54.4 | 57.1 |
| 3 | TPU:PVA (washed) | 66.9 | 66.7 |
| 4 | TPU:PEG | 55.6 | 57.1 |
| 5 | TPU:PEG (washed) | 66.8 | 66.7 |

The discrepancy between the silver content for the films of Examples 1, 2 and 4 is believed to arise from retention of water in the composite films. The film of Example 1 was not dried under vacuum prior to analysis, which may account for its higher than expected water content, even though this film did not contain a water-soluble polymer. After removal of the water-soluble polymer from the films of Examples 2 and 4, the experimental silver content was very close to that predicted by theory (samples of Examples 3 and 5). The close correlation to theory indicates that PVA and PEG were effectively removed by sonication, and very little silver was dispersed in the water-soluble phase (PVA or PEG) of the two immiscible polymers.

Composite Film Flexibility. The composite films of Examples 1-5 were qualitatively assessed for their flexibility and brittleness by manually bending the films by hand. The composite film of Example 1 cracked directly upon folding. The composite film of Example 2 was highly brittle, but after removing PVA (Example 3), the film was much more flexible and could be folded in half without cracking and breaking. Comparing Examples 4 and 5, the composite film was considerably more flexible after removing PEG (Example 5). The PEG system (Example 4) was not as rigid as the PVA system (Example 2).

Figure 4:
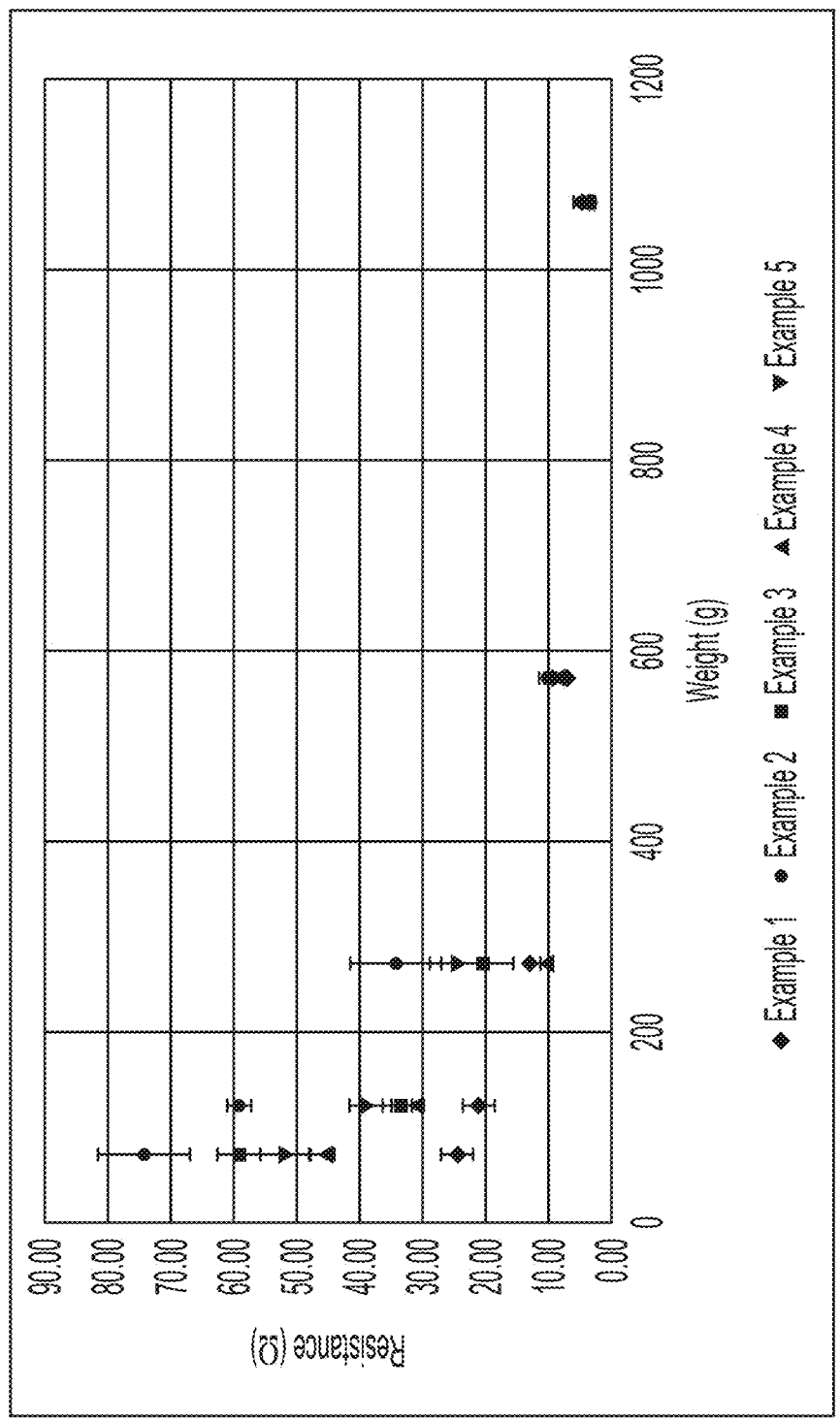
FIG. 4 shows a plot of resistance as a function of weight applied to the composite film of Examples 1-5.

Electrical Properties of Composite Films. The piezoresistive performance of the composite films of Examples 1-5 was assessed by measuring the change in resistance with varying applied pressures. Composite films for piezoresistive measurements were prepared by drying in an oven at 60° C. for 2 hours to afford a 0.8 mm film thickness. Resistance was measured using a multimeter connected to the composite. The resistance was measured at five different weights applied to the composite film: 72 g, 122 g, 272 g, 572 g, and 1072 g. An aluminum plaque (72 g) was placed on the film as a top electrode to better distribute applied force upon the composite and to provide a consistent contact area. Additional weights were added to the aluminum plaque to reach the indicated total weights. FIG. 4 shows a plot of resistance as a function of weight applied to the film of Examples 1-5. All the composite films showed a decrease in resistance with increased applied weight (load). The composite film lacking PVA or PEG (Example 1) tended to show lower initial resistance than did the other films, especially in the lower applied pressure range. At the lowest applied pressure, the composite film containing PVA (Example 2) had a statistically significant 14.3% higher resistance than did the comparable film containing PEG (Example 4). After removal of the PVA or PEG, the resistance values were much closer to one another (Examples 3 and 5), but still much higher than that of TPU alone (Example 1) at the lowest applied pressures. The composite films comprising PVA/PEG showed higher initial resistance values than the ones without, and higher sensitivity in the lower pressure range (i.e., the lower weights). As the pressure increased, the resistance values became less distinguishable from one another.

Composite Filaments. The composite films prepared as above were further processed into composite filaments using a Filabot EX6 filament extruder. The extruder consists of an extruder, an air path, and a filament winder. The extruder has four zones of heating: i) a feed port nozzle, ii) a back zone, iii) a middle zone, and iv) a front zone. The extruder was modified with a digital voltage readout for controlling the motor speed of the extrusion screw and therefore the extrusion speed. The feed path nozzle can be interchanged with nozzles of different diameters. The air path can be adjusted for airflow. The position of the air path can be adjusted with respect to the distance from an outlet nozzle, or by raising the air path on a jack. The height of the air path was kept constant in this experiment. The distance of the air path from the outlet nozzle was also varied to maintain a constant filament diameter. Table 2 summarizes the filament extrusion conditions used to prepare the composite filaments of Examples 6 and 7 (see below). The filament diameter was measured using an inline thickness gauge.

TABLE 2

| Filament Extrusion Conditions | Example 6 | Example 7 |
|---|---|---|
| Feed Temperature (° C.) | 40 | 30 |
| Back Temp (° C.) | 165 | 120 |
| Middle Temp (° C.) | 165 | 125 |
| Front Temp (° C.) | 165 | 125 |
| Voltage (V) | 7.7 | 10.0 |
| Current (A) | 0.651 | 2.2 |
| Nozzle size (mm) | 1.75 | 2 |
| Air flow | 90% | 100% |
| Winding speed (rpm) | 0.95 | 0.9 |
| Average filament diameter (mm) | 1.6 | 1.7 |

Figure 5A:
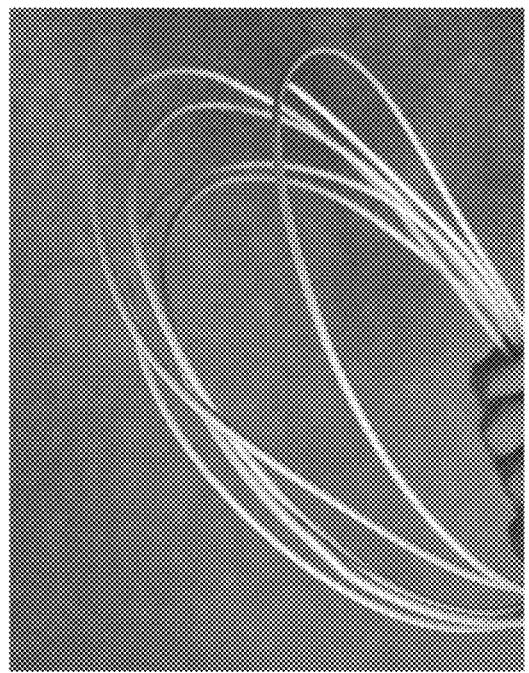
FIG. 5A shows a photograph of the composite filament of Example 6.

Example 6: Piezoresistive Filament Lacking a Water-Soluble Polymer. The composite film of Example 1 was prepared at 100 times the previous scale, ground into pieces and dried under vacuum for 2 hours. The ground material was then extruded into filaments as specified in Table 2. FIG. 5A shows a photograph of the composite filament of Example 6.

Figure 5B:
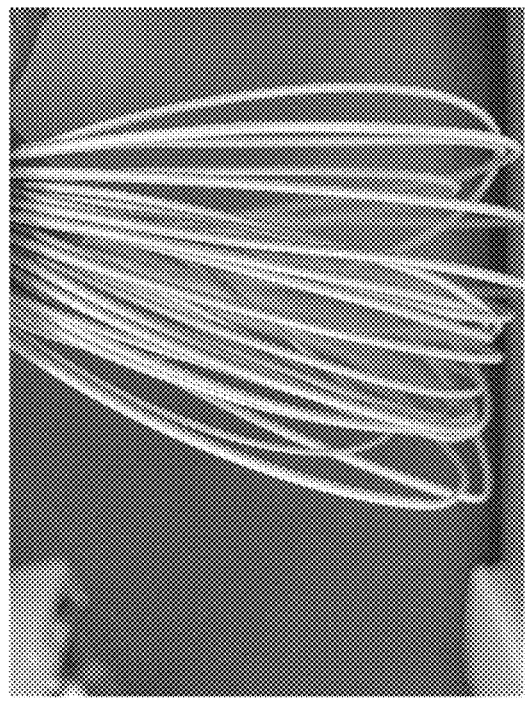
FIG. 5B shows a photograph of the composite filament of Example 7.

Example 7: Piezoresistive Filament Containing PVA. The composite film of Example 2 was prepared at 100 times the previous scale, ground into pieces and dried under vacuum for 2 hours. The ground material was then extruded into filaments as specified in Table 2. FIG. 5B shows a photograph of the composite filament of Example 7. The as-produced composite filament had an average density of 2.63 g/cm$^3$, as measured by gas pycnometry using a Micromeritics ACCYPYC 1330 instrument.

Example 8: Sonicated Piezoresistive Filament of Example 7. The composite filament of Example 7 was sonicated in water for 3 hours, soaked in water for 24 hours, and then dried under vacuum oven to remove the PVA. Sonication was conducted with a Branson 1510 ultrasonic bath. The sonicated composite filament had an average density, as measured by gas pycnometry, of 2.97 g/cm$^3$. The gas pycnometry-measured density increase is consistent with at least partial removal of PVA from the composite filaments and formation of porosity therein.

Composite Filament Flexibility. The composite filaments of Examples 6 and 7 were both quite brittle and could be easily broken with bending. After sonication and PVA removal (Example 8), the composite filament was noticeably more flexible and less brittle with a rougher and less shiny surface.

Electrical Properties of Composite Filaments. Electrical properties of 5 cm segments of the composite filaments were measured using a multimeter connected to each end of the filament. The composite filaments of Examples 6 and 7 both read infinite resistance. The composite filament of Example 8, in contrast, read a resistance in the hundreds of MΩ after removal of the PVA. Further sonication and soaking in water over two days resulted in an additional resistance decrease to 4 MΩ.

Figure 6:
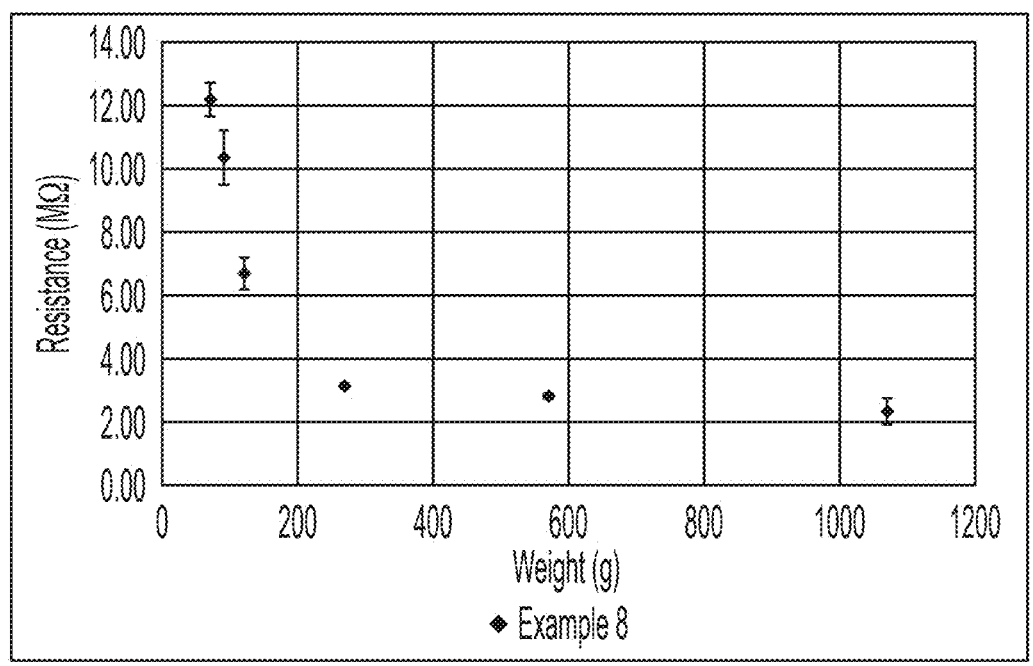
FIG. 6 shows a plot of resistance as a function of weight applied to the composite filament of Example 8.

Following removal of the PVA from the filament, the resistance change over various weight loadings was studied. The resistance was measured at five different weights applied to the composite film: 72 g, 122 g, 272 g, 572 g, and 1072 g. To conduct these measurements, one contact of the multimeter was connected to an end of the composite filament, and the second contact of the multimeter was connected to an electrically conductive film placed over the filament. FIG. 6 shows a plot of resistance as a function of weight applied to the composite filament of Example 8. As shown, the resistance decreased from 12.2 MΩ to 2.4 MΩ as the applied weight was increased. Thus, piezoresistive composites may be obtained from the composite filaments after removal of the PVA.

SEM Characterization of Composite Filaments. FIGS. 7A and 7B show SEM images of a silver microflake/TPU composite film (Example 1) at two different magnifications. As shown, the silver microflakes were dispersed mostly uniformly in the polymer matrix, with a few regions of non-uniform dispersion and porosity being present. The porosity of the film may account for its piezoresistive behavior.

Figure 8A:
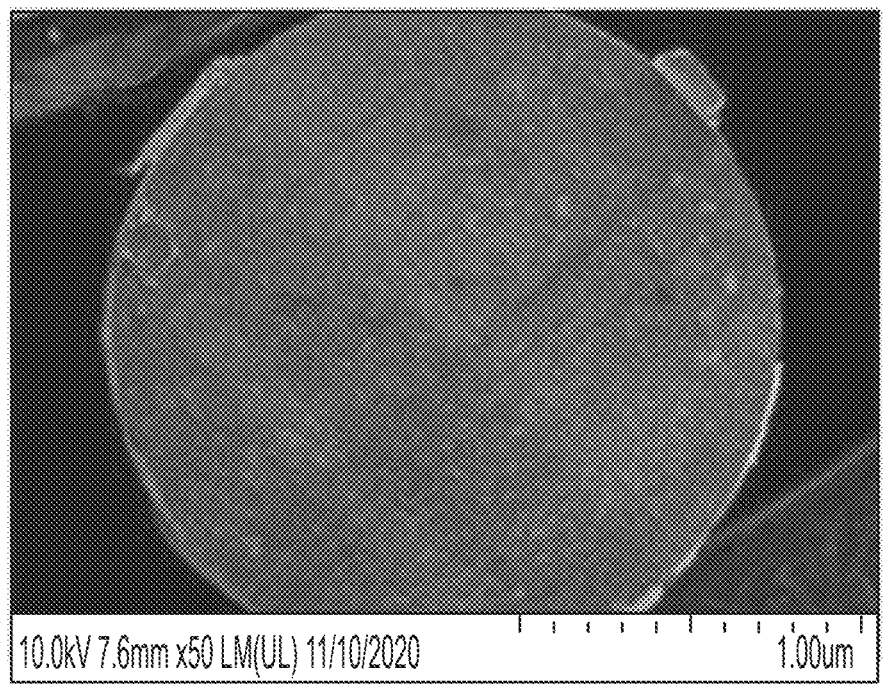
FIGS. 8A and 8B show cross-sectional SEM images of a silver microflake/TPU composite filament (Example 6) at two different magnifications.
Figure 8B:
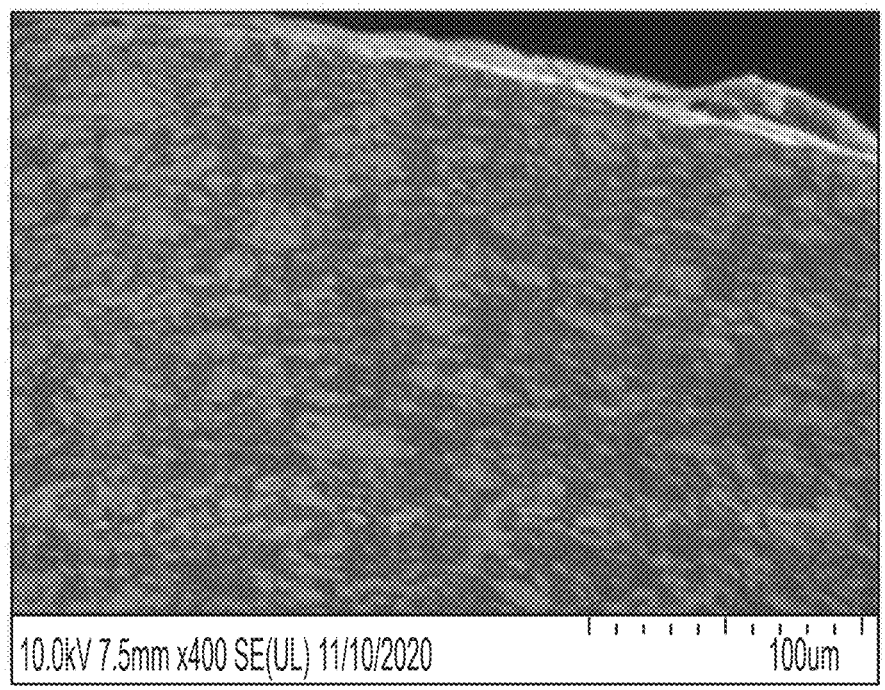
Figure 9A:
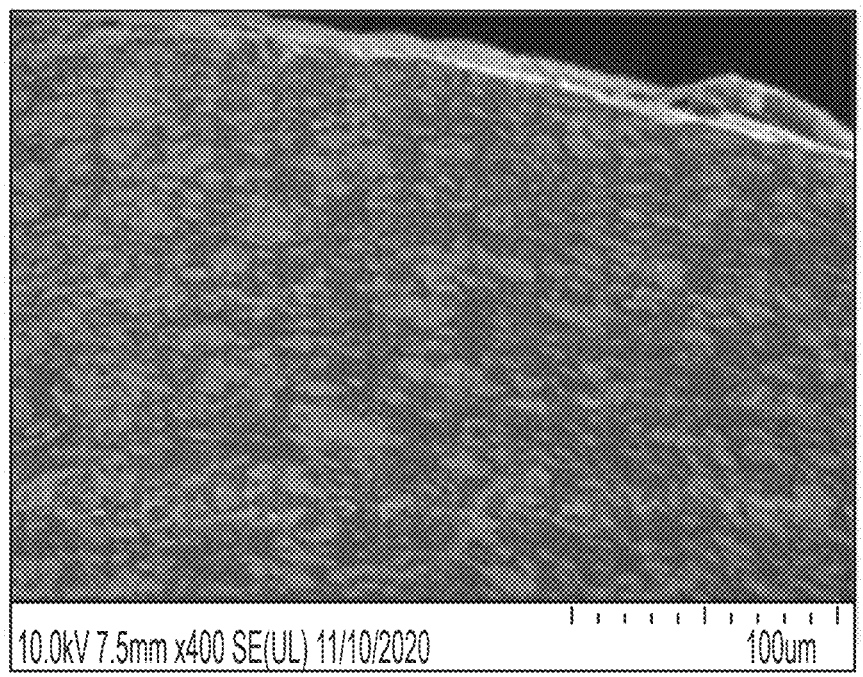
FIGS. 9A and 9B, and FIGS. 9C and 9D show cross-sectional SEM images of composite filaments of Examples 7 and 8, respectively, (before and after PVA removal) at two different magnifications.
Figure 9B:
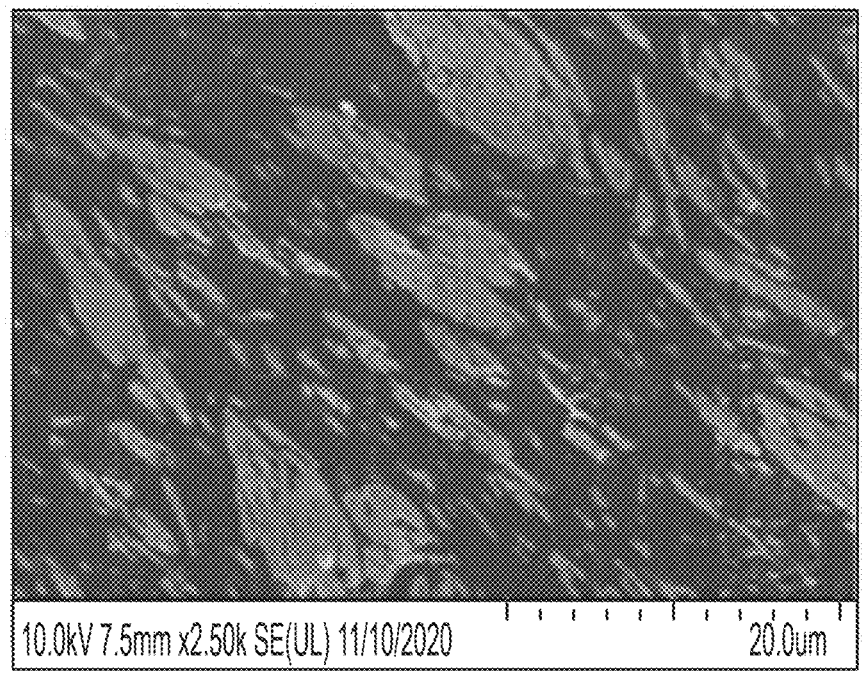
Figure 9C:
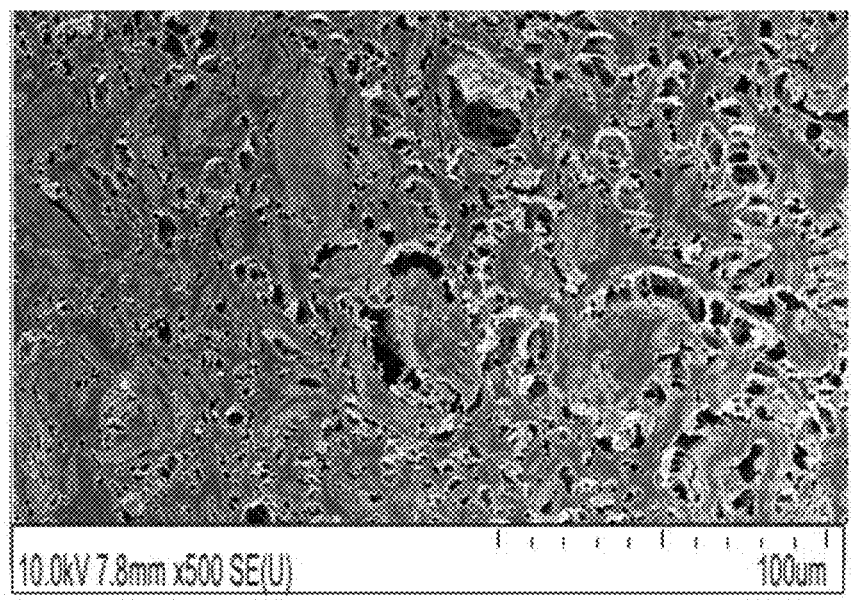
Figure 9D:
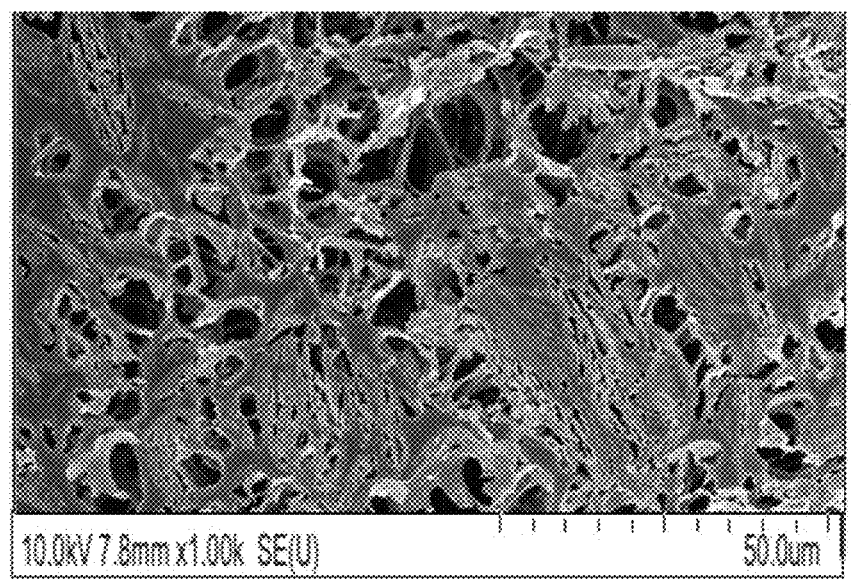

FIGS. 8A and 8B show cross-sectional SEM images of a silver microflake/TPU composite filament (Example 6) at two different magnifications. Compared to the corresponding film (FIGS. 7A and 7B), the silver microflakes were more uniformly dispersed and more densely packed in the filament. In contrast to the porous films, porosity was not evident in the filament. The lack of porosity and dense silver microflake packing may account for the lack of electrical conductivity.

FIGS. 9A and 9B, and FIGS. 9C and 9D show cross-sectional SEM images of composite filaments of Examples 7 and 8, respectively, (before and after PVA removal) at two magnifications. The composite filament of Example 7 showed uniform silver microflake distribution and dense packing, indicating that addition of PVA did not disrupt particle dispersion. Porosity was evident in the composite filament of Example 8, which may account for its electrical conductivity and piezoresistive effect.

Composite Filament Printing. The composite filament of Example 7 was printed as single- and multi-layer 2 cm×2 cm square coupons using a Hyrel HYDRA 16A 3D printer employing a HT2-250 extruder print head. Each printed layer was approximately 200 microns in thickness. A five-layer coupon was chosen as an illustrative sample for further evaluation described below. Extrusion was conducted at an extrusion rate of 10 mm/s at 170° C. onto a glass plate held at 45° C.

Figure 10:
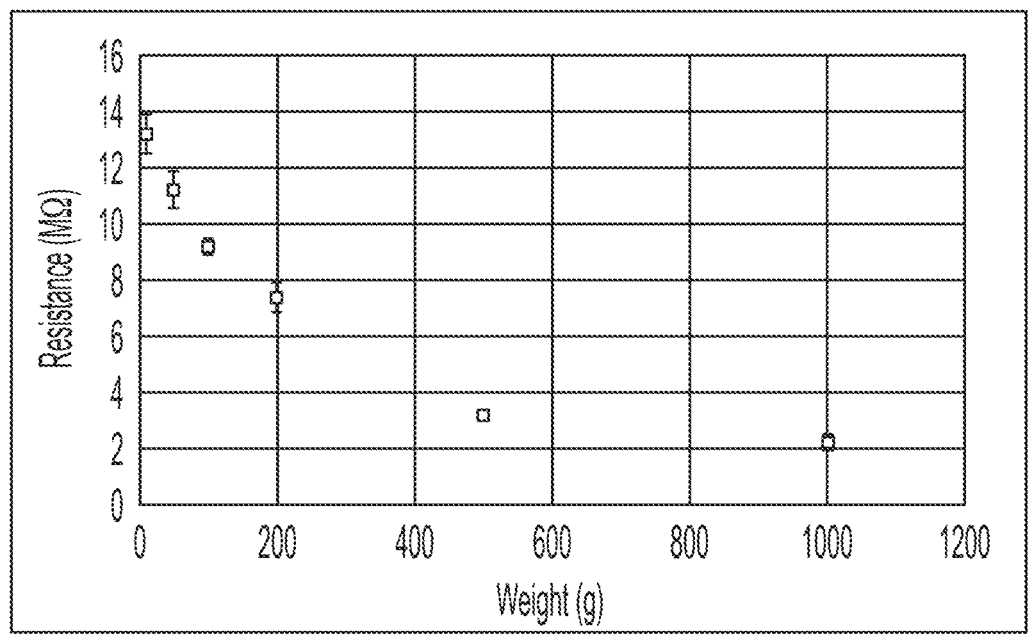
FIG. 10 shows a plot of resistance versus applied pressure in a printed part having porosity introduced therein.

The as-printed coupon was non-conductive. After sonication of the as-printed coupon to remove PVA, the resulting porous coupon was electrically conductive both upon its surface and through its cross-sectional thickness. Resistance was then measured across the cross-sectional thickness using applied weights of 10, 50, 100, 200, 500 and 1000 g. FIG. 10 shows a plot of resistance versus applied pressure. As shown, the resistance decreased gradually with increasing pressure.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A composite filament, comprising:
a continuous polymer phase comprising a first thermoplastic polymer and a second thermoplastic polymer that are immiscible with one another;
wherein the first thermoplastic polymer is dissolvable or degradable under specified conditions, and the second thermoplastic polymer is insoluble or non-degradable under the specified conditions; and
wherein the first thermoplastic polymer and the second thermoplastic polymer are distributed co-continuously in the continuous polymer phase and define an interpenetrating network; and
a plurality of electrically conductive particles distributed in the continuous polymer phase, the plurality of electrically conductive particles comprising microparticles, nanoparticles, or any combination thereof;
wherein the composite filament has a diameter of about 1.0 mm to about 10.0 mm and a spoolable length of at least about 1 foot.

2. The composite filament of claim 1, wherein the first thermoplastic polymer is water-soluble and the second thermoplastic polymer is water-insoluble.

3. The composite filament of claim 2, wherein at least a majority of the electrically conductive particles are located in the second thermoplastic polymer in the continuous polymer phase.

4. The composite filament of claim 2, wherein the first thermoplastic polymer comprises polyvinyl alcohol, polyethylene glycol, or any combination thereof.

5. The composite filament of claim 1, wherein the electrically conductive particles are present in the continuous polymer phase at a particle:polymer weight ratio ranging from about 10:90 to about 95:5, based on total composite mass.

6. The composite filament of claim 1, wherein the electrically conductive particles have an average particle size of about 10 microns or less.

7. The composite filament of claim 1, wherein the electrically conductive particles comprise a metal, a carbonaceous conductor, or any combination thereof.

8. A method comprising:
providing the composite filament of claim 1; and
depositing the composite filament layer-by-layer above a softening temperature thereof to form a printed part.

9. The method of claim 8, wherein the first thermoplastic polymer is water-soluble and the second thermoplastic polymer is water-insoluble.

10. The method of claim 9, further comprising:
removing at least a portion of the first thermoplastic polymer from the printed part to introduce porosity thereto.

11. The method of claim 9, wherein at least a majority of the electrically conductive particles are located in the second thermoplastic polymer in the continuous polymer phase.

12. A printed part comprising:
a continuous printed polymer matrix comprising a first thermoplastic polymer and a second thermoplastic polymer that are immiscible with one another;
wherein the first thermoplastic polymer is dissolvable or degradable under specified conditions, and the second thermoplastic polymer is insoluble or non-degradable under the specified conditions; and
wherein the first thermoplastic polymer and the second thermoplastic polymer are distributed co-continuously in the continuous printed polymer matrix and define an interpenetrating network; and
a plurality of electrically conductive particles distributed in the continuous printed polymer matrix, the plurality of electrically conductive particles comprising microparticles, nanoparticles, or any combination thereof.

13. The printed part of claim 12, wherein the first thermoplastic polymer is water-soluble and the second thermoplastic polymer is water-insoluble.

14. The printed part of claim 13, wherein at least a majority of the electrically conductive particles are located in the second thermoplastic polymer in the continuous printed polymer matrix.

15. The printed part of claim 13, wherein the first thermoplastic polymer comprises polyvinyl alcohol, polyethylene glycol, or any combination thereof.

16. A method comprising:
combining a plurality of electrically conductive particles and a first thermoplastic polymer that is water-soluble with an aqueous dispersion of a second thermoplastic polymer that is water-insoluble to provide a combined aqueous mixture;
removing water from the combined aqueous mixture to provide a composite residue comprising at least a portion of the electrically conductive particles distributed in a continuous polymer phase comprising the first thermoplastic polymer and the second thermoplastic polymer, the first thermoplastic polymer and the second thermoplastic polymer being immiscible with one another in the continuous polymer phase, wherein the first thermoplastic polymer and the second thermoplastic polymer are distributed co-continuously in the composite residue and define an interpenetrating network; and extruding the composite residue into a composite filament comprising the electrically conductive particles distributed in the continuous polymer phase;

wherein the composite filament has a diameter of about 1.0 mm to about 10.0 mm and a spoolable length of at least about 1 foot.

17. The method of claim 16, wherein the first thermoplastic polymer comprises polyvinyl alcohol, polyethylene glycol, or any combination thereof.

18. The method of claim 16, wherein removing water from the combined aqueous mixture comprises casting the combined aqueous mixture as a composite film, and evaporating the water.

19. The method of claim 18, further comprising:

breaking up the composite film into a plurality of composite pieces after evaporating the water therefrom, and extruding the composite pieces to form the composite filament.

\* \* \* \* \*